US012811309B2

(12) United States Patent
Werntz et al.

(10) Patent No.: US 12,811,309 B2
(45) Date of Patent: Nov. 24, 2026

(54) CONFOCAL ANTENNA SYSTEM

(71) Applicant: The Boeing Company, Arlington, VA (US)

(72) Inventors: Paul C. Werntz, Long Beach, CA (US); Raenaurd D. Turpin, La Mirada, CA (US)

(73) Assignee: The Boeing Company, Arlington, VA (US)

( * ) Notice: Subject to any disclaimer, the term of this patent is extended or adjusted under 35 U.S.C. 154(b) by 25 days.

(21) Appl. No.: 18/752,117

(22) Filed: Jun. 24, 2024

(65) Prior Publication Data

US 2024/0347925 A1 Oct. 17, 2024

Related U.S. Application Data

(62) Division of application No. 17/566,568, filed on Dec. 30, 2021, now Pat. No. 12,051,853.

(51) Int. Cl.
*H01Q 19/19* (2006.01)
*H01Q 15/14* (2006.01)
*H01Q 15/16* (2006.01)

(52) U.S. Cl.
CPC ......... *H01Q 19/192* (2013.01); *H01Q 15/141* (2013.01); *H01Q 15/16* (2013.01)

(58) Field of Classification Search
CPC .. H01Q 15/141; H01Q 15/147; H01Q 15/148; H01Q 15/16; H01Q 15/165; H01Q 15/166; H01Q 15/167; H01Q 15/168; H01Q 15/18; H01Q 19/106; H01Q 19/12; H01Q 19/19; H01Q 19/192; Y10T 29/49016
See application file for complete search history.

(56) References Cited

U.S. PATENT DOCUMENTS 4,203,105 A 5/1980 Dragone et al.
4,298,877 A 11/1981 Sletten
4,605,935 A 8/1986 Kusano
4,631,545 A 12/1986 Dragone
4,755,826 A 7/1988 Rao
4,827,277 A 5/1989 Becker et al.
4,978,967 A 12/1990 Masujima
5,096,281 A * 3/1992 Windebank ............. B24B 13/06 451/5
5,136,294 A * 8/1992 Iwata ..................... H01Q 19/19 343/781 CA
5,191,350 A 3/1993 Hemmie
5,198,827 A 3/1993 Seaton
5,402,137 A 3/1995 Ramanujam et al.
6,169,524 B1 1/2001 Wu et al.
6,172,649 B1 1/2001 Lenormand et al.
(Continued)

FOREIGN PATENT DOCUMENTS

WO 2019170541 A1 9/2019

*Primary Examiner* — Thomas J Hong
*Assistant Examiner* — Joshua D Anderson
(74) *Attorney, Agent, or Firm* — Alleman Hall LLP

(57) ABSTRACT

A reflector for an antenna includes a first shaped region, wherein a curvature of the first shaped region is defined by a corresponding scan angle, and a second shaped region, wherein a curvature of the second shaped region is based on a corresponding scan angle. The curvature of the first shaped region is different than the curvature of the second shaped region.

8 Claims, 14 Drawing Sheets

(56) References Cited

U.S. PATENT DOCUMENTS

| | | | | |
|---|---|---|---|---|
| 6,225,997 | B1 * | 5/2001 | Mitsuoka | G06F 3/04817 709/224 |
| 6,977,622 | B2 * | 12/2005 | Hay | H01Q 15/147 343/781 CA |
| 7,345,653 | B2 * | 3/2008 | Nolan | H01Q 15/141 343/912 |
| 9,054,414 | B2 | 6/2015 | Mizzoni et al. | |
| 9,537,222 | B2 | 1/2017 | Boutigny et al. | |
| 11,831,075 | B2 * | 11/2023 | Stirland | H01Q 3/16 |
| 2004/0008148 | A1 | 1/2004 | Lyerly et al. | |
| 2005/0099350 | A1 | 5/2005 | Gothard et al. | |
| 2005/0099351 | A1 | 5/2005 | Gothard et al. | |
| 2008/0094298 | A1 | 4/2008 | Kralovec et al. | |
| 2014/0028494 | A1 * | 1/2014 | Ksienski | G01S 13/887 342/25 A |
| 2014/0292605 | A1 | 10/2014 | Roberts | |
| 2017/0250455 | A1 | 8/2017 | Runyon et al. | |
| 2017/0338556 | A1 * | 11/2017 | Yi | H01Q 15/165 |
| 2018/0097291 | A1 | 4/2018 | Mizuno et al. | |
| 2018/0131101 | A1 | 5/2018 | Evtyushkin et al. | |
| 2019/0190145 | A1 | 6/2019 | Yi et al. | |
| 2019/0207321 | A1 | 7/2019 | Hollenbeck et al. | |
| 2020/0313296 | A1 | 10/2020 | Mitchelson et al. | |
| 2021/0126376 | A1 | 4/2021 | Tuau | |
| 2021/0175633 | A1 | 6/2021 | Reveles et al. | |
| 2022/0021111 | A1 | 1/2022 | Naym et al. | |

* cited by examiner

CONFOCAL ANTENNA SYSTEM

CROSS-REFERENCE TO RELATED APPLICATIONS

This application is a Divisional of U.S. application Ser. No. 17/566,568 filed on Dec. 30, 2021, the entire contents of which are incorporated herein by reference.

BACKGROUND

Confocal antennas are used in different applications. For example, confocal antennas are used in communication satellites to magnify the image of a feed array. Known confocal antenna configurations use two parabolic reflectors including a large main reflector and a small sub-reflector to achieve signal magnification. However, poor aperture efficiency and high main/primary reflector spill-over are inherent with dual parabolic confocal reflector systems in these known configurations. High reflector spillover is particularly a problem for satellite antenna applications when transmitting wherein the energy can impinge on the spacecraft bus and support structures, causing scattering and electromagnetic interference (EMI) issues. This problem is caused by scanned induced translation of the energy across the aperture of the feed array.

Thus, with known confocal antenna designs, there is a tradeoff between poor aperture efficiency and high reflector spillover, or reducing the magnification of the system to improve aperture efficiency, which reduces gain or requires increased feed size. As such, both tradeoff options have disadvantages resulting in less than optimal or desirable operating characteristics.

SUMMARY

Some examples provide a reflector for an antenna. The reflector includes a first shaped region, wherein a curvature of the first shaped region is defined by a corresponding scan angle, and a second shaped region, wherein a curvature of the second shaped region is based on a corresponding scan angle. The curvature of the first shaped region is different than the curvature of the second shaped region.

Other examples provide a method for manufacturing a reflector for an antenna. The method includes tracing a plurality of electromagnetic energy rays from a plurality of scan directions and shaping a plurality of reflector regions based on the traced plurality of electromagnetic energy rays, wherein the plurality of reflector regions have different curvatures corresponding to the scan directions. The method further includes performing a local optimization of the curvatures of the plurality of reflector regions and blending the locally optimized plurality of reflector regions. The method also includes performing a global optimization of the blended plurality of reflector regions and generating an overall shape using the globally optimized plurality of reflector regions. The method additionally includes forming a reflector based on the overall shape.

Still other examples provide a reflector arrangement for an antenna, wherein the reflector arrangement includes a main reflector and a sub-reflector having a non-parabolic shape. The sub-reflector is configured to direct electromagnetic energy rays to the main reflector.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present disclosure will become more fully understood from the detailed description given herein and the accompanying drawings, which are given by way of illustration only, and thus, are not limiting of the described examples, wherein.

Corresponding reference characters indicate corresponding parts throughout the drawings.

DETAILED DESCRIPTION

Referring to the figures, some examples provide a confocal antenna system configured having a shaped reflector, particularly a shaped sub-reflector. In various examples, the antenna system operates within the high microwave frequency bands. For example, various examples operate to establish and maintain wireless communications sufficient to support a high-speed, high-performance global communications infrastructure, and/or provide spacecraft telemetry and command system operations. Such frequency bands include, but are not limited to, the K-band (12 GHz-26.5 GHZ), Ka-band (26.5 GHZ-40 GHz) and the V-band (40 GHZ-75 GHZ). The Ka-band and V-band are used in such existing applications, but are also applicable to other applications, such as next-generation wireless communications networks. Such next-generation wireless communications networks include, for example, fifth-generation (5G) mobile communications systems utilizing the Ka-band, and the SES Networks O3B NETWORKS® mPOWER satellite-based communications network utilizing the Ka-Band.

A confocal antenna system according to various examples has a sub-reflector shaped such that each scan direction is optimized, thereby enhancing the efficiency and applicability of reflector system. That is, the shaped sub-reflector is a shaped reflector having one or more shaped regions with different curvatures providing optimized focal lengths that correct for aberrations. In some examples, the sub-reflector shape decreases main reflector spillover, thereby reducing scattering and poor antenna pattern performance that can cause EMI issues with other sensors, such as within a satellite. For example, in satellite antenna applications where the transmit energy can impinge on the spacecraft (satellite) bus and support structures causing scattering and EMI issues from the scanned induced translation of the energy across the aperture of the feed array, one or more examples have improved centering of the energy on the feed array for all scan angles. As a result, the scattering and EMI issues are reduced or eliminated. That is, with a shaped sub-reflector according to various examples, the energy remains better centered on the feed array as a function of the scan. This results in an increased efficiency of the reflector antenna system and reduces main reflector spillover. Beam performance characteristics are also improved, such as circular beam and sidelobe performance.

Figure 1:
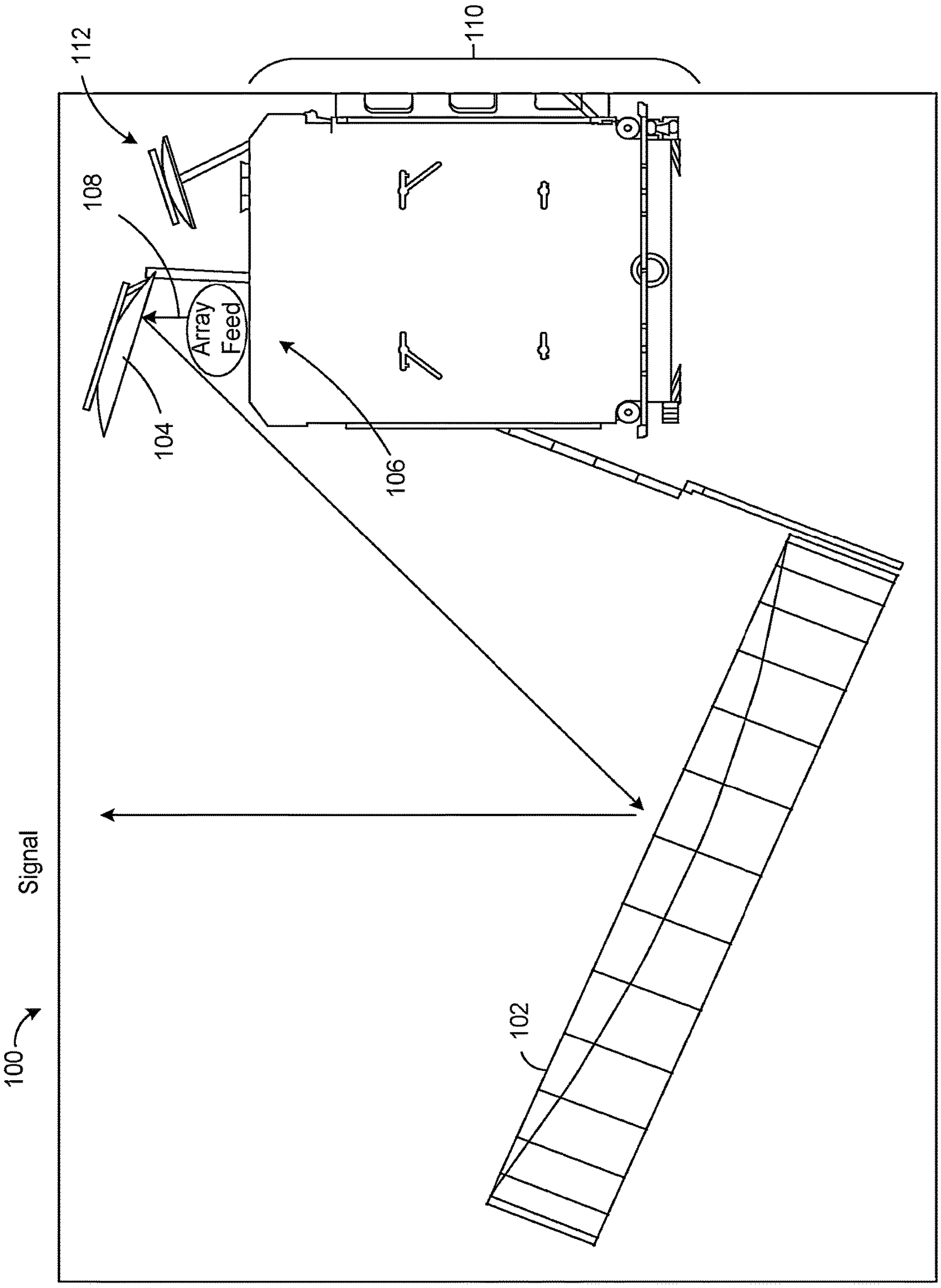
FIG. 1 is a diagram illustrating an antenna system in accordance with an example.
Figure 2:
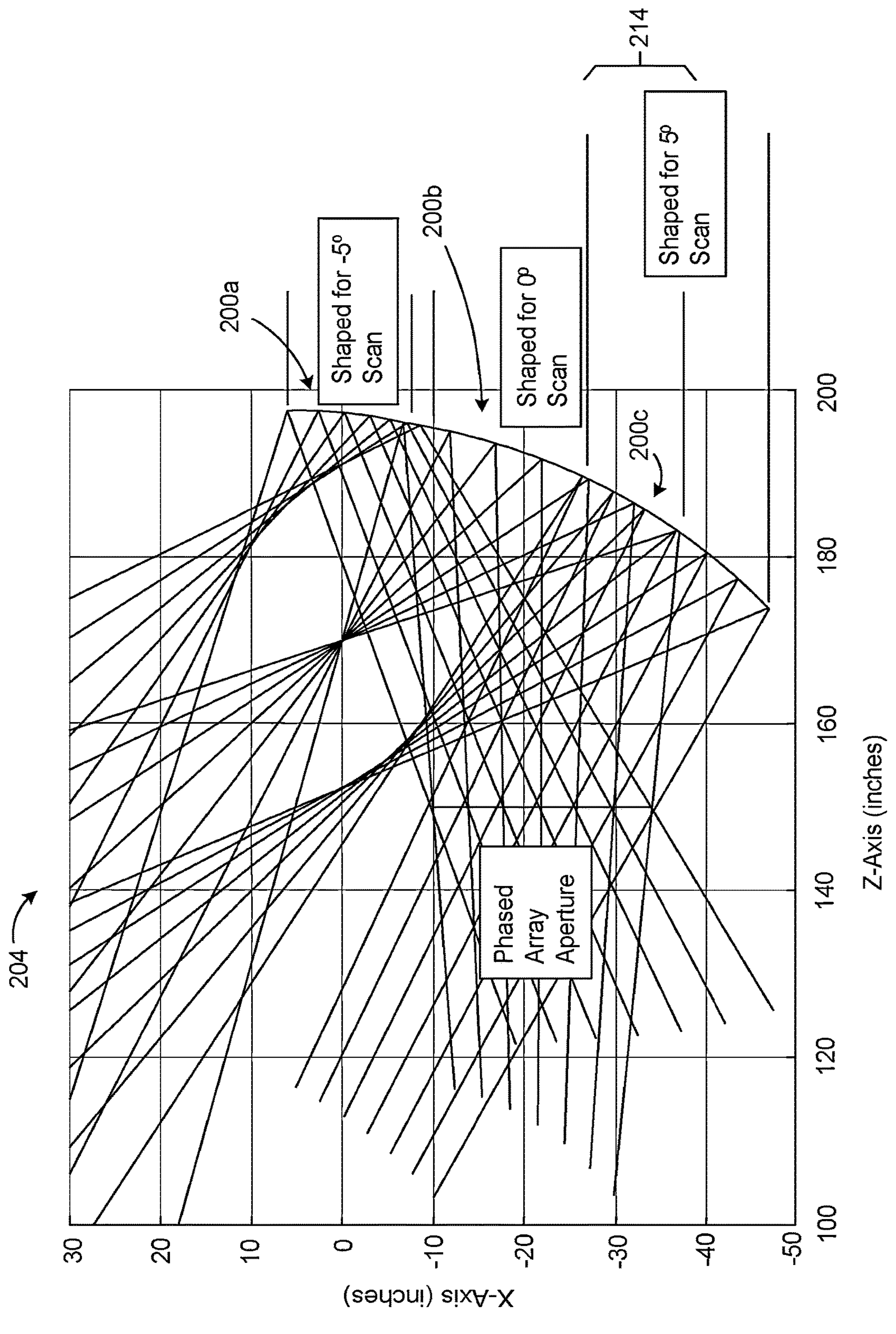
FIG. 2 is a diagram illustrating a shaped reflector according to an example.
Figure 3:
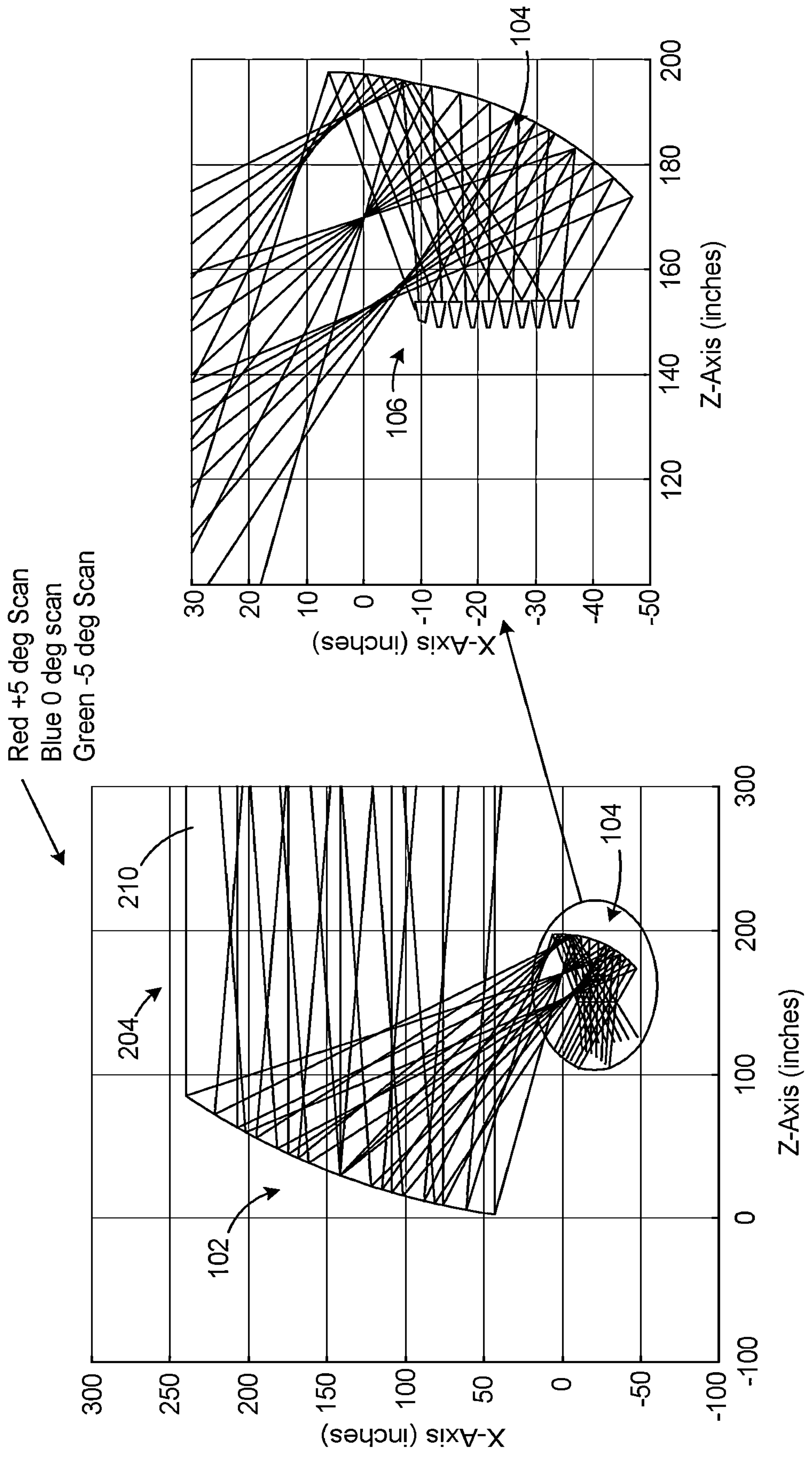
FIG. 3 is another diagram illustrating a shaped reflector according to an example.

Referring to FIGS. 1-3, an antenna system, which in various examples is a dual-reflector or confocal antenna system 100, includes a first reflector 102, illustrated as a main reflector, and a second reflector 104 illustrated as a sub-reflector. An array feed 106 is configured to allow for steering of a signal 108, thereby providing an array fed reflector configuration. That is, the first and second reflectors 102, 104 (e.g., first and second mirrors) form a confocal magnification configuration, wherein in some examples the first and second reflectors 102, 104 together act like a telescope that produces a collimated output beam. The array feed 106 in the illustrated example is configured as a transmit array feed that is part of a signal feed system 110 that also include a receive array system 112 (e.g., an RX confocal system).

In some examples, the confocal antenna system 100 is used in spaceborne satellite systems to transmit and/or receive electromagnetic energy for communication and other purposes. That is, to focus the electromagnetic energy, the first and second reflectors 102, 104 are used in combination with a feed assembly (illustrated as the array feed 106), such that the feed assembly illuminates the second reflector 104 with an electromagnetic energy beam. The second reflector 104 then reflects the electromagnetic energy to the first reflector 102 that reflects and focuses the electromagnetic energy beam into a radiation pattern for transmission (e.g., transmission to Earth). Similarly, the confocal antenna system 100 focuses impinging electromagnetic energy from an incident radiation source into a reflected beam on the feed assembly when the confocal antenna system 100 is receiving a signal.

The confocal antenna system 100 in various examples reduces the amount of wasted power in a satellite antenna, which can result in extreme losses. For example, power is wasted when unwanted areas on the Earth's surface receive a portion of the transmitted signal. Hence, the confocal antenna system 100 is configured in some examples to be tuned to the desired coverage region so that as much power as possible is gathered from the region while little or no power is gathered from outside of the region. In various examples, the transmit and receive signals generated by the confocal antenna system 100 have radiation patterns contoured to fit the shape of a desired coverage region. For example, the desired coverage region may be Europe, the continental United States, or a group of cities.

In various examples, the radiation patterns (e.g., shaped contour radiation patterns) are more efficiently produced using a shaped second reflector 104 wherein the electromagnetic energy remains better centered on the array feed 106 as a function of the scan. Electromagnetic energy spillover from the first reflector 102 is also reduced. As described in more detail herein, the shaped second reflector 104 is configured as a sub-reflector having differently shaped portions that are configured based on the scan direction. That is, in various examples, the differently shaped portions are optimized for each scan direction to more efficiently produce a desired radiation pattern. For example, the second reflector 104 having differently shaped reflector regions is illustrated in FIGS. 2-5. That is, a plurality of shaped regions 200 are configured based on a corresponding scan direction. In some examples, sets or subsets of shaped regions 200 are configured to produce a desired radiation pattern. As shown in FIG. 2, illustrating a cross-section of the second reflector 104 configured as the sub-reflector, the shaped regions 200*a*, 200*b*, 200*c* are shaped based on a corresponding scan direction. For example, each of the shaped regions 200*a*, 200*b*, 200*c* is differently angled or curved such that a relative angle of curvature or slope of each is different.

Figure 4:
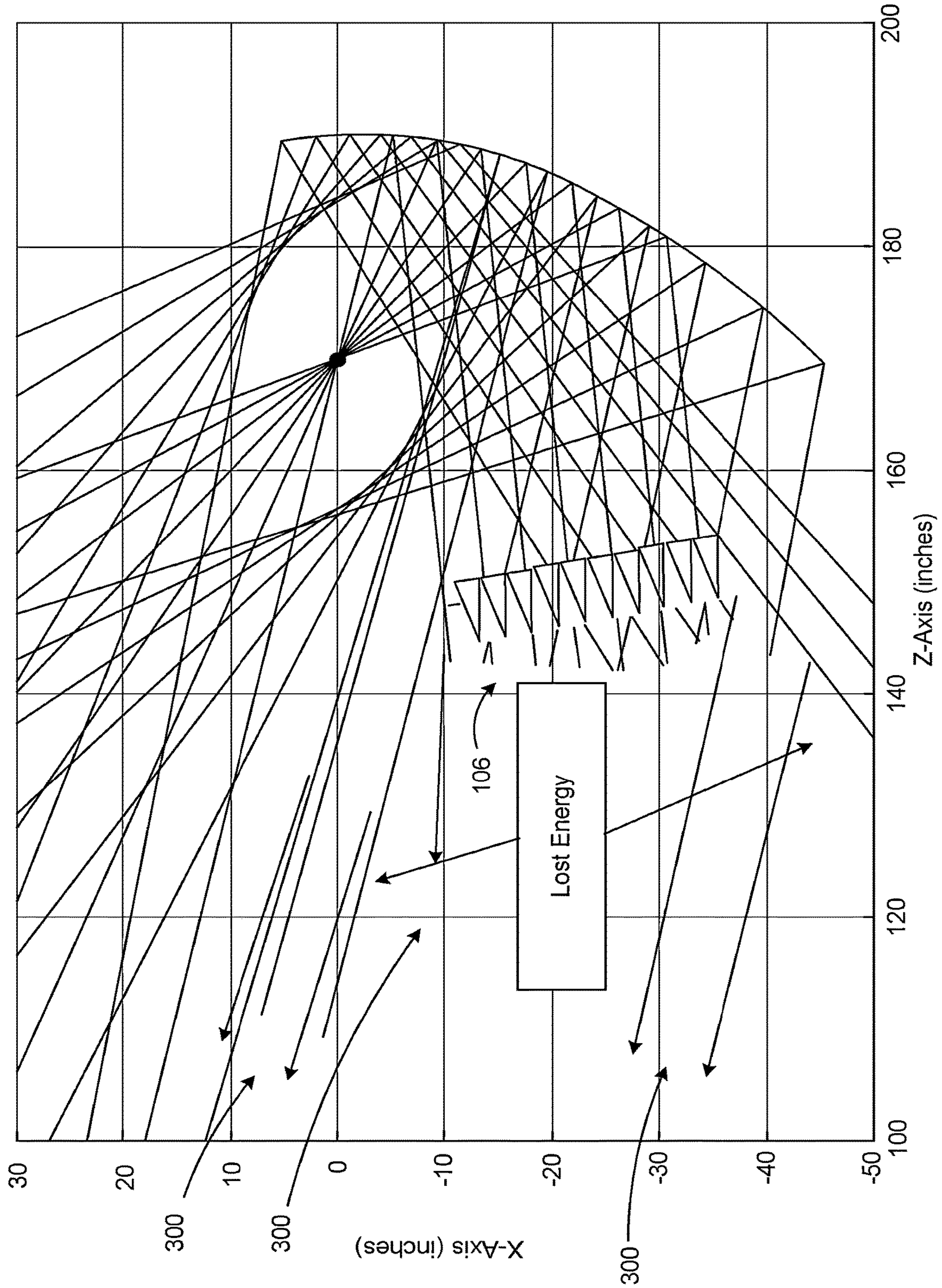
FIG. 4 is a diagram of a reflector illustrating lost energy.

In the illustrated example, the shaped regions 200*a*, 200*b*, 200*c* define differently angled or curved portions shaped for scan directions of −5 degrees, 0 degrees, and +5 degrees, respectively. As can be seen by the ray traces 204, for each scan direction, the illuminated portion of the second reflector 104 is shaped to direct all the incident energy to the feed array aperture. As illustrated, the shaped regions 200*a*, 200*b*, 200*c* form a non-parabolic overall shape (e.g., a non-parabolic reflective surface) to the second reflector 104. That is, the radius of curvature or slope along the entire surface of the second reflector 104 is not the same. In some examples, the shaped regions 200*a*, 200*b*, 200*c* are configured such that the corresponding curve of the second reflector 104 is not a plane curve that is mirror symmetrical. Instead, the shaped regions 200*a*, 200*b*, 200*c* are angled or curved based on the desired or required scan directions. As a result, and as seen more clearly in FIG. 3, energy loss is reduced or minimized by using the shaped regions 200*a*, 200*b*, 200*c* that direct the electromagnetic energy to the feed array. That is, electromagnetic energy rays that do not strike the array feed 106 represent lost energy and reduced efficiency. In various examples, with the configuration of the second reflector 104 having the shaped regions 200*a*, 200*b*, 200*c*, this lost energy and reduced efficiency is minimized or eliminated. For example, as shown in FIG. 4, without the shaped regions 200*a*, 200*b*, 200*c*, some of the electromagnetic energy rays 300 do not strike the feed array and therefore is lost energy and results in reduced efficiency.

Thus, the second reflector 104 has the shaped regions 200*a*, 200*b*, 200*c* configured or designed based on the scan direction, such as to maximize the electromagnetic energy rays that hit or strike the array feed 106. For example, with the shaped regions 200*a*, 200*b*, 200*c*, plane wave signals are more efficiently recreated or produced in a smaller area. That is, plane wave signals are recreated or produced from each of the shaped regions 200*a*, 200*b*, 200*c* instead of from the overall second reflector 104, such that the confocal antenna system 100 includes a more efficient smaller sub-reflector, namely the second reflector 104 having the shaped regions 200*a*, 200*b*, 200*c*. For example, having the shaped regions 200*a*, 200*b*, 200*c* that are each differently shaped or configured results in shaped reflector portions that more efficiently collimate or focus the beam pattern (e.g., collimate or focus beams of energy into a selected shaped beam pattern with high radiation efficiency). In some examples, the shaped regions 200*a*, 200*b*, 200*c* are configured to define ideal reflector surfaces based on signal scanning requirements, such as the different scan angles as described in more detail herein. That is, the geometries of the shaped regions 200*a*, 200*b*, 200*c* produce a higher efficiency second reflector 104 tuned based on a plurality of scan angles. It should be appreciated that additional or fewer shaped regions 200 can be defined in various examples, and the shaped regions can be of different sizes and shapes.

The shaped regions 200*a*, 200*b*, 200*c* can be formed using any suitable reflector material and can be formed from one or multiple layers. For example, the shaped regions 200*a*, 200*b*, 200*c* can be formed from a base or support made from a material or having a material thereon that reflects electromagnetic energy rays.

Various methodologies can be used to generate and/or build the shaped reflector surfaces described herein. In one or more examples, a shaping algorithm is used to define the properties or characteristics of the shaped regions 200*a*, 200*b*, 200*c*. For example, the shaping algorithm is performed using reflector analysis tools in the antenna reflector design technology. It should be noted that the reflector analysis tools can include the use of physical optics or geometric optics (e.g., ray tracing). In one example, ray tracing is used because of the increased speed in processing over other techniques. In some examples, the analysis tool and shaping algorithm is configured or selected based on the problem to be solved (e.g., the design constraints for the antenna or reflectors). That is, different antenna and EM modeling methods and/or software (e.g., GRASP feature of the TICRA antenna and EM modelling software) can be used. The shaping algorithm in various examples is configured as a sub-reflector shaping algorithm and can be performed in a transmit mode (electromagnetic energy is transmitted from the feed) or a receive mode (a plane wave incident on the aperture).

It should be appreciated that in various examples, reciprocity ensures that the efficiency increase due to sub-reflector shaping is identical for transmit or receive, regardless of selecting transmit mode or receive mode shaping. In one example, for transmit mode sub-reflector shaping, the goal of the sub-reflector shaping is to increase the illumination efficiency of the main reflector (e.g., the first reflector 102) as a function of the scan. For receive mode sub-reflector shaping, the goal of sub-reflector shaping is to increase the illumination efficiency of the feed as a function of the scan. For example, receive mode synthesis is illustrated in FIG. 3. The sub-reflector shaping in some examples exploits the physics that different portions of the sub-reflector are illuminated for different scan directions (see FIG. 2).

Figure 5:
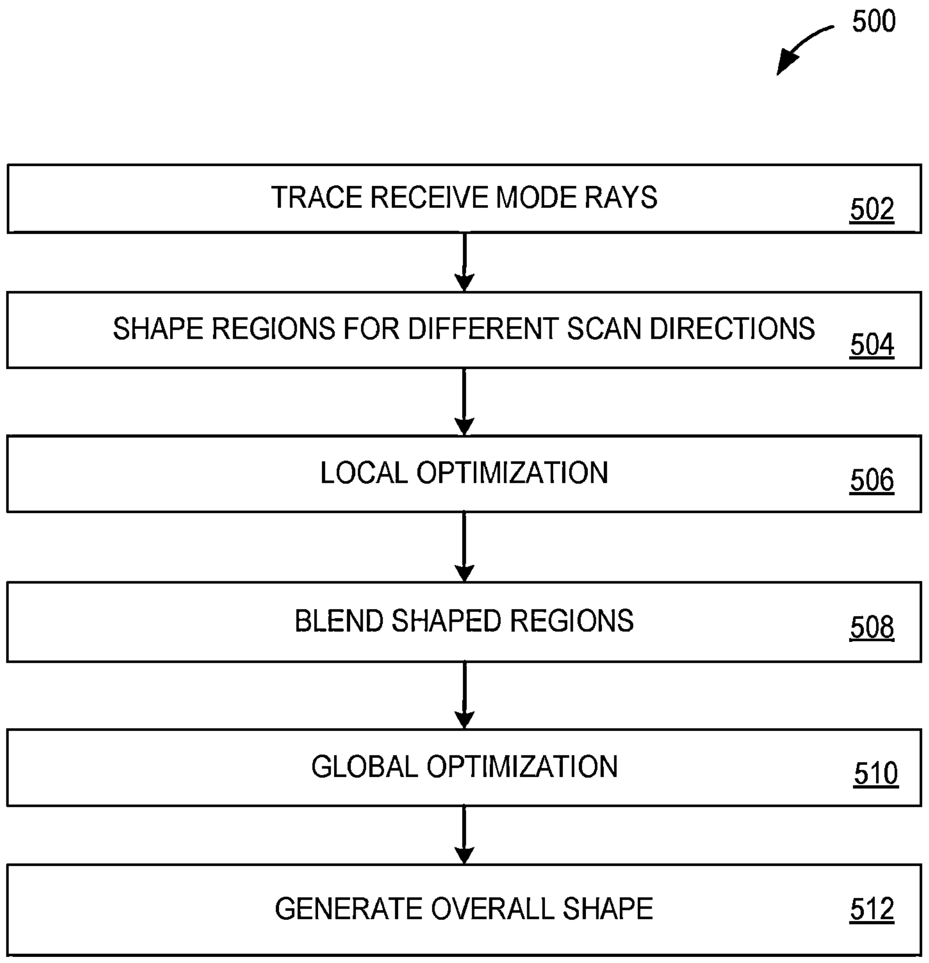
FIG. 5 illustrates a flow chart of a method for forming a shaped reflector according to an example.

An example of sub-reflector shaping, such as for shaping the second reflector 104 will now be described with particular reference to a method 500 as illustrated FIG. 5. The method 500 performs sub-reflector shaping using geometric optics receive mode ray tracing and can be used to form or manufacture a shaped reflector. However, the method can be similarly employed using different techniques, such as for transmit mode ray tracing to form different types of reflectors. The method 500 includes tracing receive mode rays at 502. For example, using one or more ray tracing techniques, receive mode electromagnetic energy rays are traced from main reflector plane wave illumination (e.g., plane wave illumination of the first reflector 102). In various examples, the rays are traced from multiple scan directions that bound a desired field of view (FOV) of the reflector or array system. For example, in the illustration of FIG. 3, rays 210 are traced for +5 degrees, 0 degrees, and −5 degrees in the reflector plane of offset, as illustrated by the ray traces 204. It should be noted that scan directions that are not in the plane of offset are also used in some examples, such as for full three-dimensional (3D) sub-reflector analysis.

At 504, a plurality of regions are shaped for the different scan directions (e.g., different curvatures are determined). For example, the regions 200*a*, 200*b*, 200*c* are shaped for the different scan directions. In one example, for each scan direction, the illuminated portion of the sub-reflector (e.g., the second reflector 104) is shaped to direct all the energy to the feed array aperture (e.g., the aperture of the array feed 106). In some examples, shaping is performed by modeling the surface with a polynomial and adjusting the polynomial coefficients to obtain the desired shape. In other examples, shaping is performed by modeling the reflector surface with a set of points and using spline interpolation to ensure a continuous surface with a continuous first derivative (a smooth surface) that passes through the points. The regions 200*a*, 200*b*, 200*c* are differently curved or have different arcuate shapes or profiles, such as based on the different scan angles. That is, each of the regions 200*a*, 200*b*, 200*c* has a corresponding curved shape or arcuate shape that is different. In various examples, a curvature of each of the regions 200*a*, 200*b*, 200*c* is adjusted or configured based on the corresponding scan direction for the regions 200*a*, 200*b*, 200*c*. For example, localized curvatures for each of the regions 200*a*, 200*b*, 200*c* are defined based on the illuminated portion of the second reflector 104 for the corresponding scan angle to direct all the incident energy to the feed array as described in more detail herein.

In one example, a local optimization is performed at 506. That is, an optimization with respect to the reflective properties or characteristics of each of the different shaped regions is performed, namely individually for each of the different shapes regions to ensure that all the energy from each of the shaped portions is directed to the feed array aperture. An optimization algorithm is used in various examples to select polynomial coefficients or reflector points, wherein the cost function for the optimization algorithm is defined by an array aperture illumination percentage. It should be noted that the shaping algorithm in various examples does not include array illumination phase information. In operation, array element phase control is used to match the phase of the incident field.

The shaping algorithm in various examples overlaps the portions (e.g., shaped regions 200) of the sub-reflector where the portions will be illuminated by other scan directions (e.g., overlap region 214 shown in FIG. 2). It should be noted that shaped sections, at this point, are not defined or configured to form a continuous surface, but are defined to optimize local properties for each of the shaped sections. For example, each of the regions 200*a*, 200*b*, 200*c* (see FIG. 2) is shaped for optimized operation at a corresponding scan angle.

Figure 6:
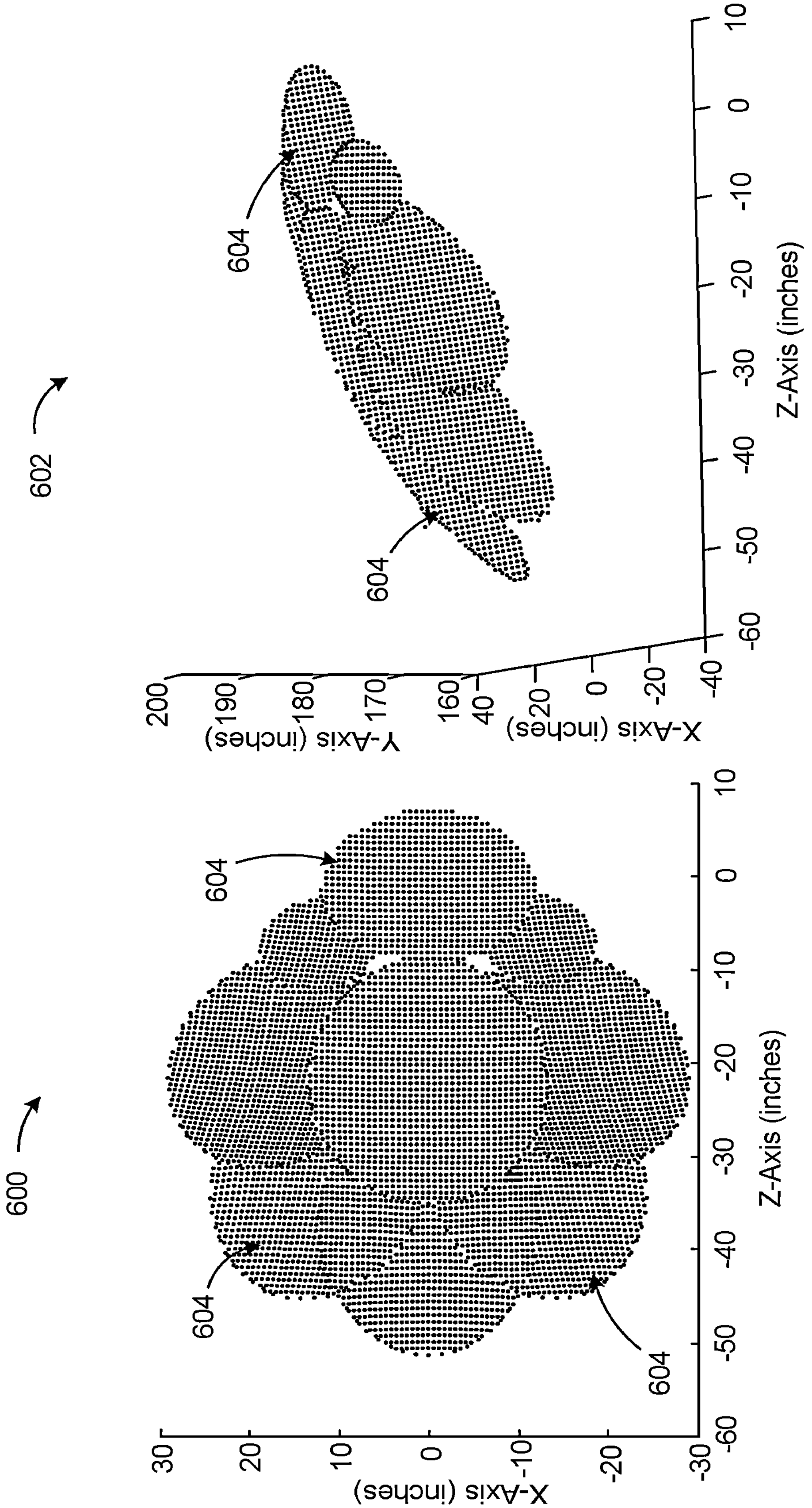
FIG. 6 illustrates points for reflector shaping according to an example.

The shaped regions are then blended at 508. For example, the regional shaped sections (e.g., the shaped regions 200*a*, 200*b*, 200*c*) of the sub-reflector that are shaped for each scan direction are blended into a single continuous surface. As shown in the graphs 600, 602 in FIG. 6, the polynomials or splines that define the regional reflector sections 604 are used to obtain points for each of the regional reflector sections 604. That is, discrete points are obtained from the regional polynomial or spline equations that define each regional reflector section 604 that corresponds to sub-reflector sections. It should be noted that the points in different regional reflector sections 604 can overlap. It should also be noted that while nine scan directions are used in the illustrated example, a different number of scan directions can be used, such as based on design requirements, antenna operation, etc.

Figure 7:
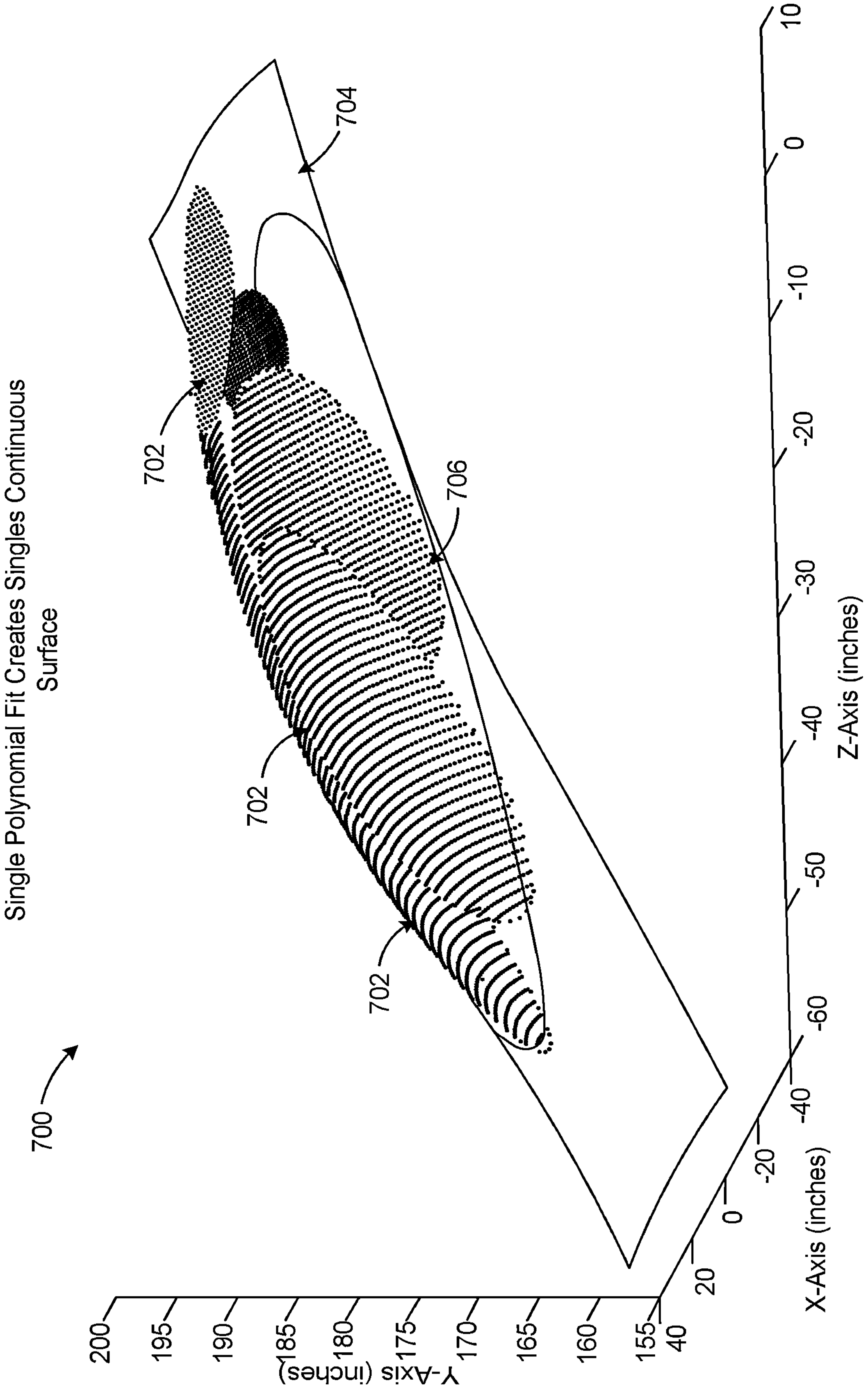
FIG. 7 illustrates a polynomial fitting according to an example.
Figure 8:
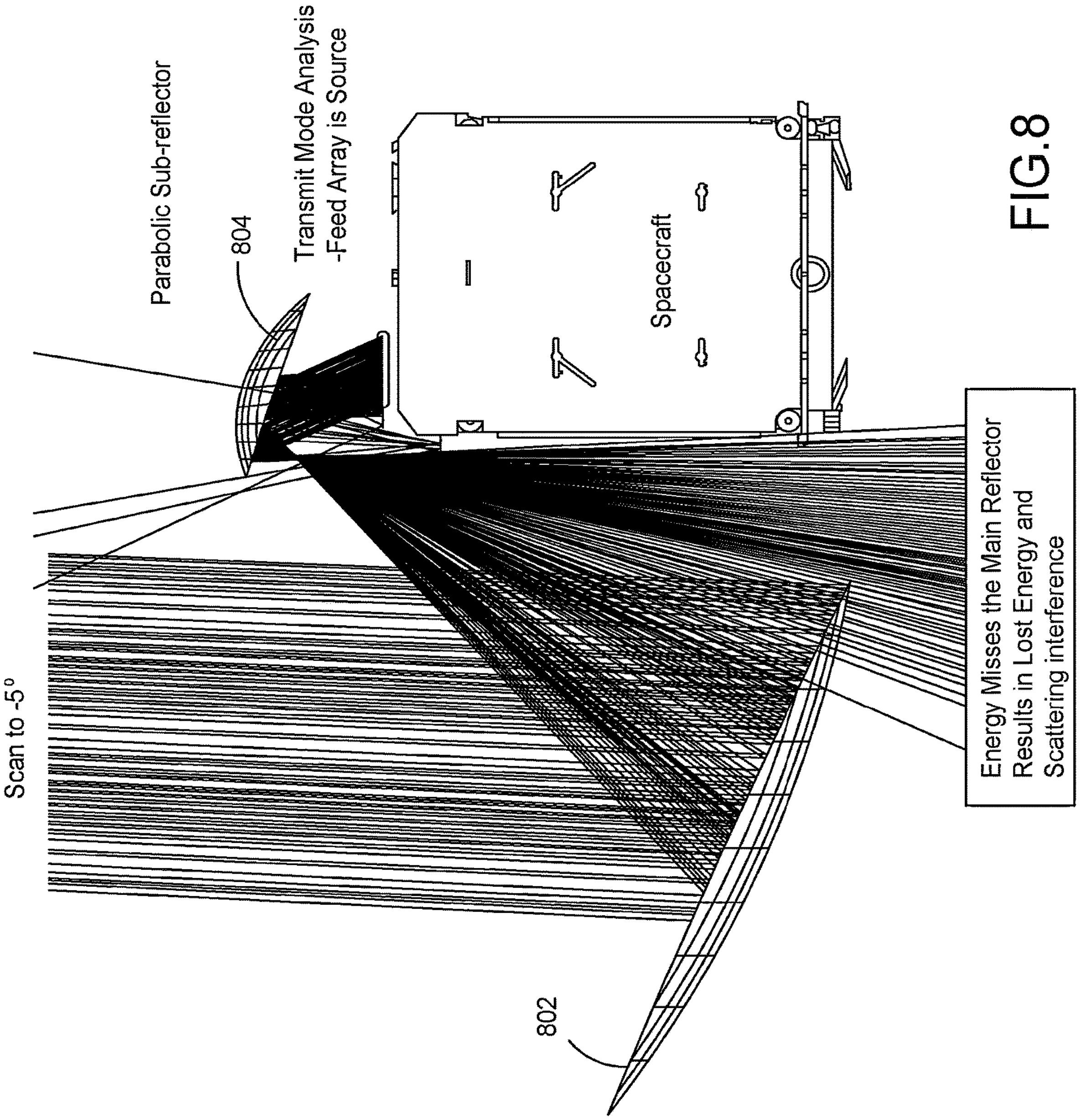
FIG. 8 illustrates lost energy in a reflector arrangement.
Figure 9:
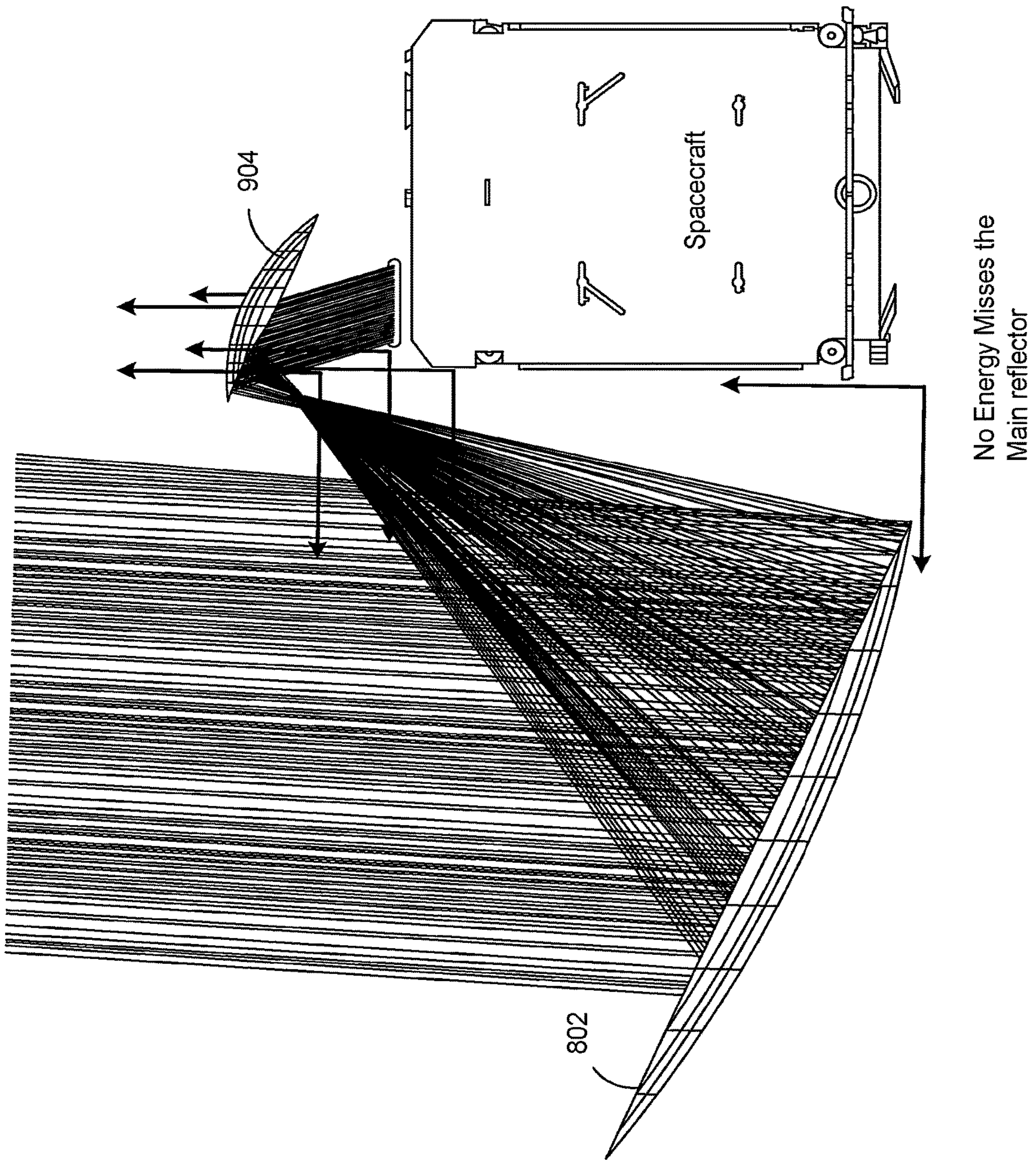
FIG. 9 illustrates a dual reflector arrangement without energy loss according to an example.

Referring again to the method 500, a global optimization is then performed at 510. For example, a global polynomial or spline is fit across the entire surface to obtain a single continuous sub-reflector surface 700 as illustrated in FIG. 7. That is, a global optimization with respect to all of the regional shaped sections is performed that includes surface data points 702 from the shaping algorithm. In the illustrated example, a polynomial fit 704 is used to define an optimized surface. In one example, when using a TICRA GRASP program, a RIM (e.g., boundary 706) is applied by the program for the analysis to be performed. An overall shape is then generated at 512 based on the globally optimized overall surface, which is more efficient as illustrated by the TICRA GRASP Tx analysis shown in FIGS. 8 and 9. As can be seen in the transmit mode analysis, the parabolic sub-reflector 804 provide less illumination of the main reflector 802 than the shaped sub-reflector 904 (e.g., the second reflector 104 having the shaped regions 200). That is, with the parabolic sub-reflector 804, energy misses the main reflector 802 resulting in lost energy and scattering interference. With the shaped sub-reflector 904 according to one or more examples, the energy is focused within the main reflector 802 such that no energy misses the main reflector 802.

Figure 10:
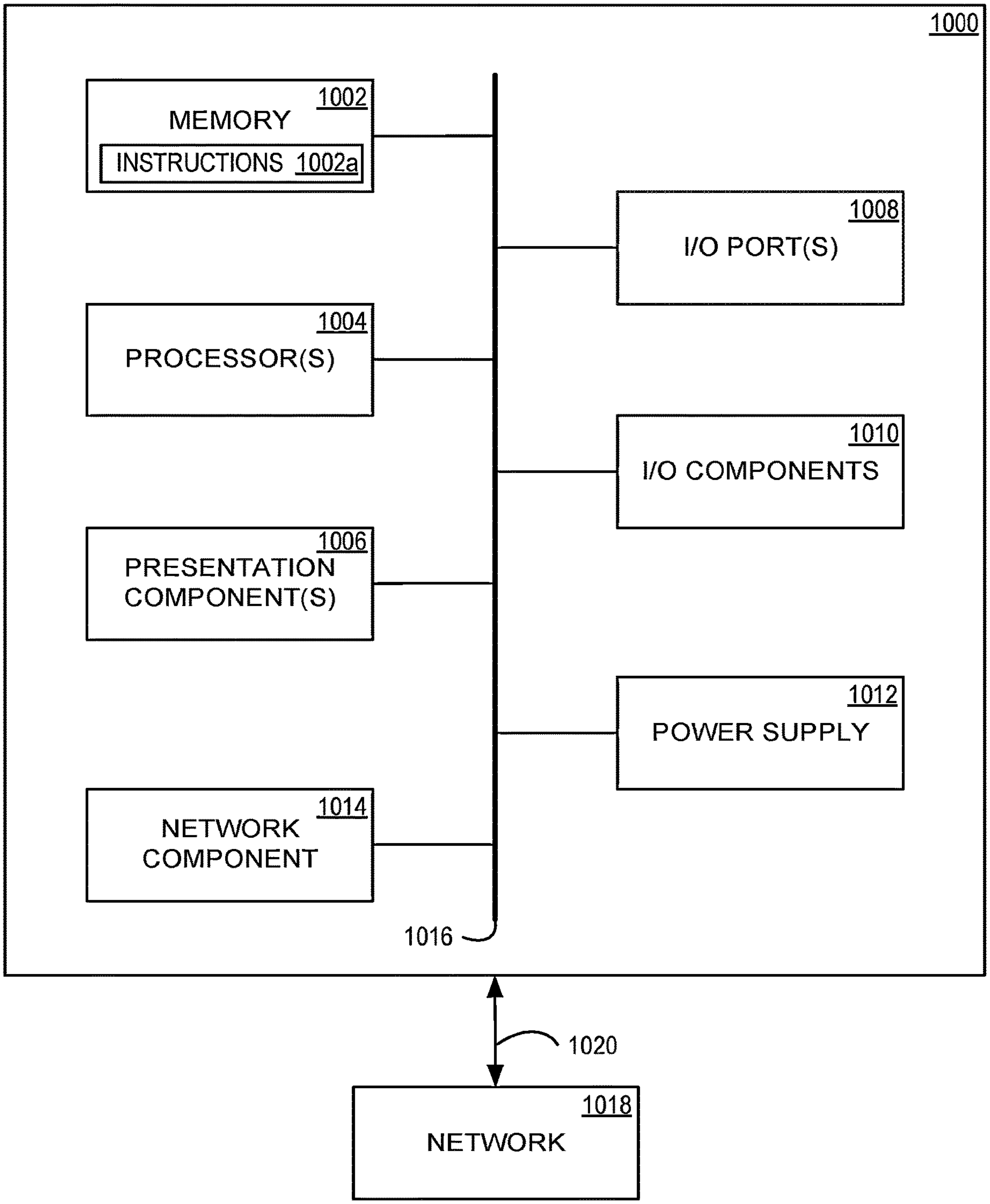
FIG. 10 is a block diagram of a computing device suitable for implementing various aspects of the disclosure according to an example.

With reference now to FIG. 10, a block diagram of the computing device 1000 suitable for implementing various aspects of the disclosure is described (e.g., a control system for the antenna or reflectors). In some examples, the computing device 1000 includes one or more processors 1004, one or more presentation components 1006 and the memory 1002. The disclosed examples associated with the computing device 1000 are practiced by a variety of computing devices, including personal computers, laptops, smart phones, mobile tablets, hand-held devices, consumer electronics, specialty computing devices, etc. Distinction is not made between such categories as "workstation," "server," "laptop," "hand-held device," etc., as all are contemplated within the scope of FIG. 10 and the references herein to a "computing device." The disclosed examples are also practiced in distributed computing environments, where tasks are performed by remote-processing devices that are linked through a communications network. Further, while the computing device 1000 is depicted as a seemingly single device, in one example, multiple computing devices work together and share the depicted device resources. For instance, in one example, the memory 1002 is distributed across multiple devices, the processor(s) 1004 provided are housed on different devices, and so on.

In one example, the memory 1002 includes any of the computer-readable media discussed herein. In one example, the memory 1002 is used to store and access instructions 1002*a* configured to carry out the various operations disclosed herein. In some examples, the memory 1002 includes computer storage media in the form of volatile and/or nonvolatile memory, removable or non-removable memory, data disks in virtual environments, or a combination thereof. In one example, the processor(s) 1004 includes any quantity of processing units that read data from various entities, such as the memory 1002 or input/output (I/O) components 1010. Specifically, the processor(s) 1004 are programmed to execute computer-executable instructions for implementing aspects of the disclosure. In one example, the instructions are performed by the processor, by multiple processors within the computing device 1000, or by a processor external to the computing device 1000. In some examples, the processor(s) 1004 are programmed to execute instructions such as those illustrated in the flow charts discussed below and depicted in the accompanying drawings.

The presentation component(s) 1006 present data indications to an operator or to another device. In one example, presentation components 1006 include a display device, speaker, printing component, vibrating component, etc. One skilled in the art will understand and appreciate that computer data is presented in a number of ways, such as visually in a graphical user interface (GUI), audibly through speakers, wirelessly between the computing device 1000, across a wired connection, or in other ways. In one example, presentation component(s) 1006 are not used when processes and operations are sufficiently automated that a need for human interaction is lessened or not needed. I/O ports 1008 allow the computing device 1000 to be logically coupled to other devices including the I/O components 1010, some of which is built in. Implementations of the I/O components 1010 include, for example but without limitation, a microphone, keyboard, mouse, joystick, game pad, satellite dish, scanner, printer, wireless device, etc.

The computing device 1000 includes a bus 1016 that directly or indirectly couples the following devices: the memory 1002, the one or more processors 1004, the one or more presentation components 1006, the input/output (I/O) ports 1008, the I/O components 1010, a power supply 1012, and a network component 1014. The computing device 1000 should not be interpreted as having any dependency or requirement related to any single component or combination of components illustrated therein. The bus 1016 represents one or more busses (such as an address bus, data bus, or a combination thereof). Although the various blocks of FIG. 10 are shown with lines for the sake of clarity, some implementations blur functionality over various different components described herein.

In some examples, the computing device 1000 is communicatively coupled to a network 1018 using the network component 1014. In some examples, the network component 1014 includes a network interface card and/or computer-executable instructions (e.g., a driver) for operating the network interface card. In one example, communication between the computing device 1000 and other devices occur using any protocol or mechanism over a wired or wireless connection 1020. In some examples, the network component 1014 is operable to communicate data over public, private, or hybrid (public and private) using a transfer protocol, between devices wirelessly using short range communication technologies (e.g., near-field communication (NFC), Bluetooth® branded communications, or the like), or a combination thereof.

Although described in connection with the computing device 1000, examples of the disclosure are capable of implementation with numerous other general-purpose or special-purpose computing system environments, configurations, or devices. Implementations of well-known computing systems, environments, and/or configurations that are suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, VR devices, holographic device, and the like. Such systems or devices accept input from the user in any way, including from input devices such as a keyboard or pointing device, via gesture input, proximity input (such as by hovering), and/or via voice input.

Implementations of the disclosure are described in the general context of computer-executable instructions, such as program modules, executed by one or more computers or other devices in software, firmware, hardware, or a combination thereof. In one example, the computer-executable instructions are organized into one or more computer-executable components or modules. Generally, program modules include, but are not limited to, routines, programs, objects, components, and data structures that perform particular tasks or implement particular abstract data types. In one example, aspects of the disclosure are implemented with any number and organization of such components or modules. For example, aspects of the disclosure are not limited to the specific computer-executable instructions or the specific components or modules illustrated in the figures and described herein. Other examples of the disclosure include different computer-executable instructions or components having more or less functionality than illustrated and described herein. In implementations involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable, and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. In one example, computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium used to store information for access by a computing device. In contrast, communication media typically embody computer readable instructions, data structures, program modules, or the like in a modulated data signal such as a carrier wave or other transport mechanism and include any information delivery media.

Figure 11:
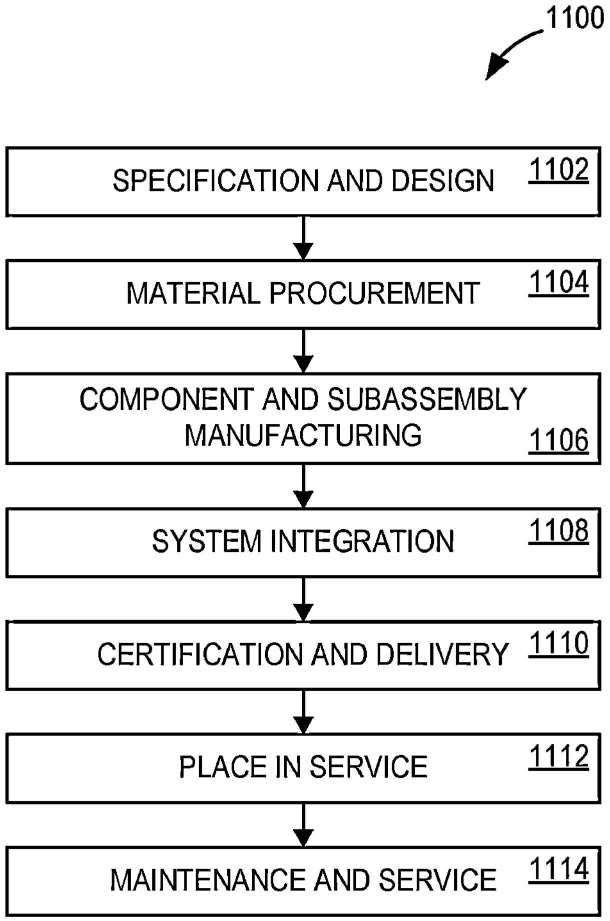
FIG. 11 is a block diagram of an apparatus production and service method that advantageously employs various aspects of the disclosure according to an example.
Figure 12:
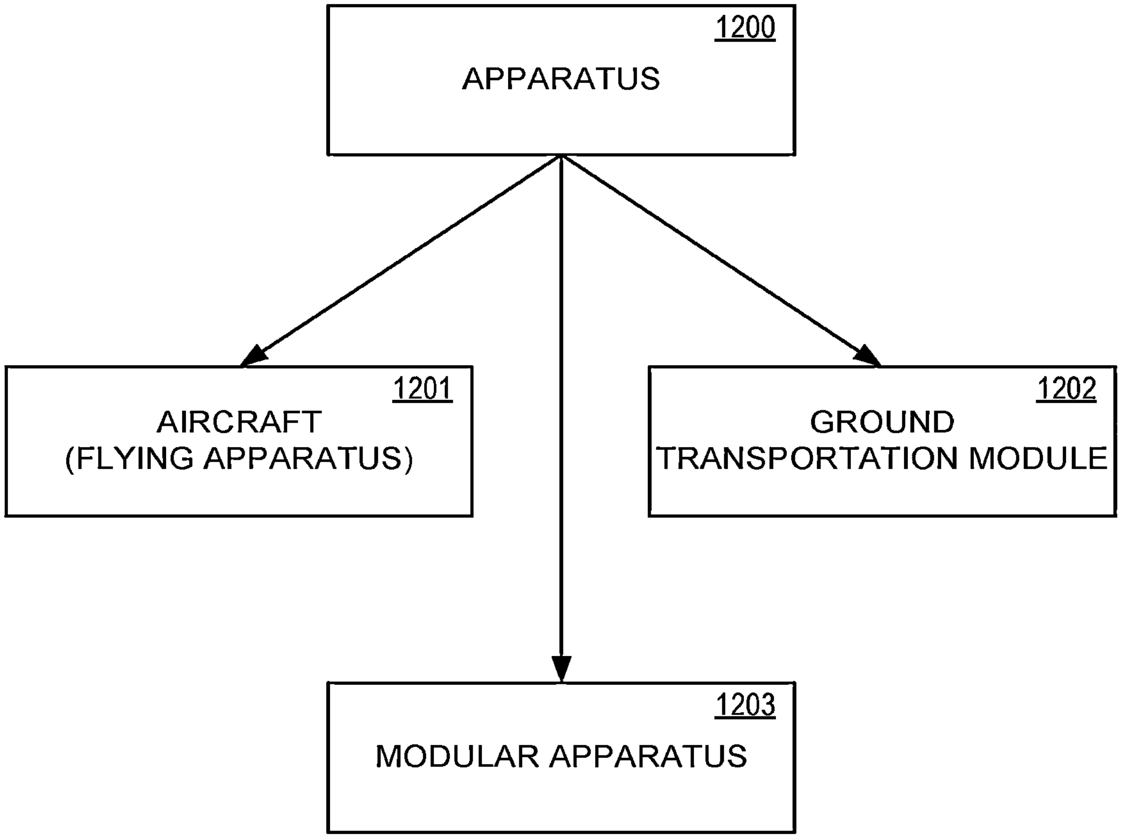
FIG. 12 is a block diagram of an apparatus for which various aspects of the disclosure may be advantageously employed according to an example.

Some examples of the disclosure are used in manufacturing and service applications as shown and described in relation to FIGS. 11-14. Thus, examples of the disclosure are described in the context of an apparatus of manufacturing and service method 1100 shown in FIG. 11 and apparatus 1200 shown in FIG. 12. In FIG. 11, a diagram illustrating an apparatus manufacturing and service method 1100 is depicted in accordance with an example. In one example, during pre-production, the apparatus manufacturing and service method 1100 includes specification and design 1102 of the apparatus 1200 in FIG. 12 and material procurement 1104. During production, component, and subassembly manufacturing 1106 and system integration 1108 of the apparatus 1200 in FIG. 12 takes place. Thereafter, the apparatus 1200 in FIG. 12 goes through certification and delivery 1110 in order to be placed in service 1112. While in service by a customer, the apparatus 1200 in FIG. 12 is scheduled for routine maintenance and service 1114, which, in one example, includes modification, reconfiguration, refurbishment, and other maintenance or service subject to configuration management, described herein.

In one example, each of the processes of the apparatus manufacturing and service method 1100 are performed or carried out by a system integrator, a third party, and/or an operator. In these examples, the operator is a customer. For the purposes of this description, a system integrator includes any number of apparatus manufacturers and major-system subcontractors; a third party includes any number of vendors, subcontractors, and suppliers; and in one example, an operator is an owner of an apparatus or fleet of the apparatus, an administrator responsible for the apparatus or fleet of the apparatus, a user operating the apparatus, a leasing company, a military entity, a service organization, or the like.

With reference now to FIG. 12, the apparatus 1200 is provided. As shown in FIG. 12, an example of the apparatus 1200 is a flying apparatus 1201, such as an aerospace vehicle, aircraft, air cargo, flying car, satellite, planetary probe, deep space probe, solar probe, and the like. As also shown in FIG. 12, a further example of the apparatus 1200 is a ground transportation apparatus 1202, such as an automobile, a truck, heavy equipment, construction equipment, a boat, a ship, a submarine, and the like. A further example of the apparatus 1200 shown in FIG. 12 is a modular apparatus 1203 that comprises at least one or more of the following modules: an air module, a payload module, and a ground module. The air module provides air lift or flying capability. The payload module provides capability of transporting objects such as cargo or live objects (people, animals, etc.). The ground module provides the capability of ground mobility. The disclosed solution herein is applied to each of the modules separately or in groups such as air and payload modules, or payload and ground, etc. or all modules.

Figure 13:
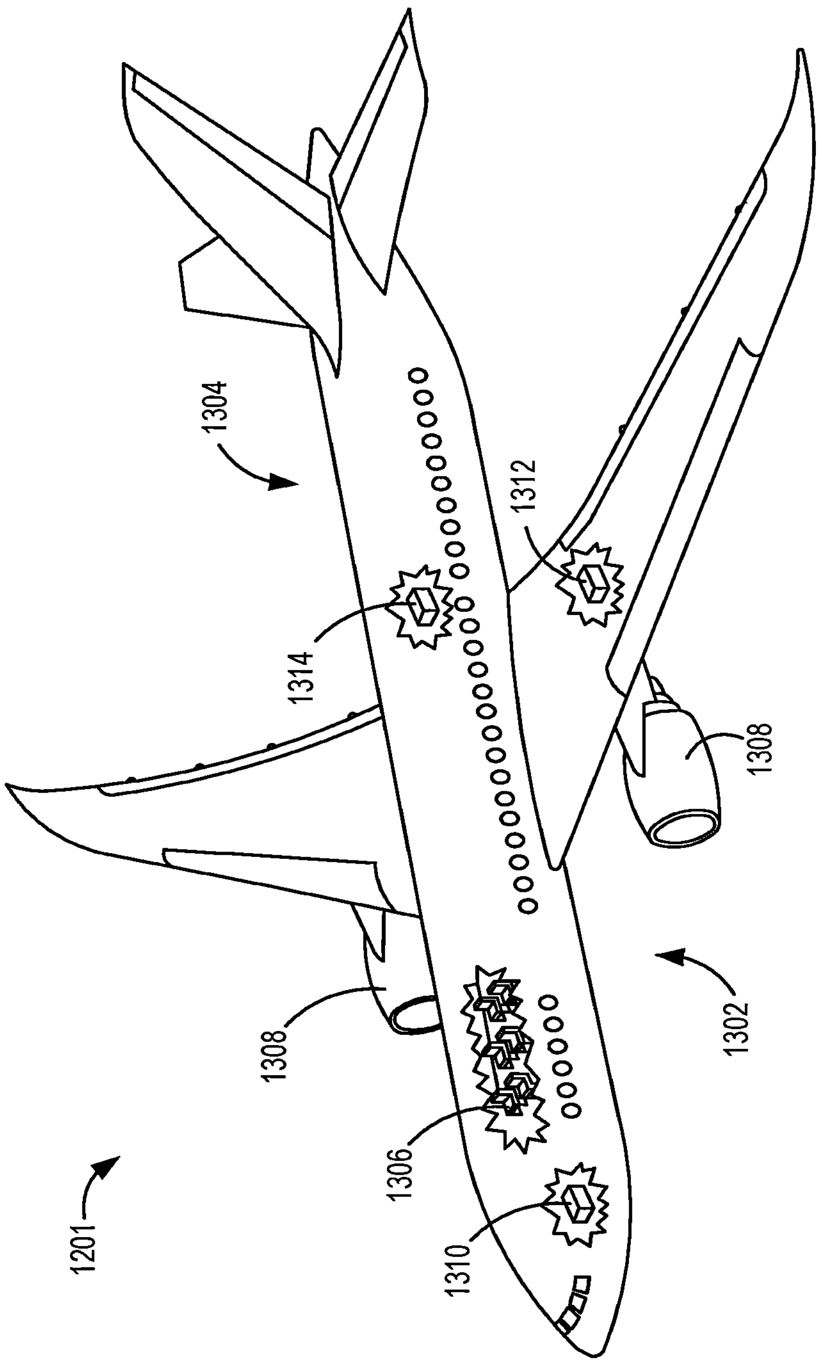
FIG. 13 is a schematic perspective view of a flying apparatus according to an example.

With reference now to FIG. 13, a more specific diagram of the flying apparatus 1201 is depicted in which an implementation of one or more examples is advantageously employed. In this example, the flying apparatus 1201 is an aircraft produced by the apparatus manufacturing and service method 1100 in FIG. 11 and includes an airframe 1302 with a plurality of systems 1304 and an interior 1306. Examples of the plurality of systems 1304 include one or more of a propulsion system 1308, an electrical system 1310, a hydraulic system 1312, and an environmental system 1314. However, other systems are also candidates for inclusion. Although an aerospace example is shown, different advantageous examples are applied to other industries, such as the automotive industry, etc.

Figure 14:
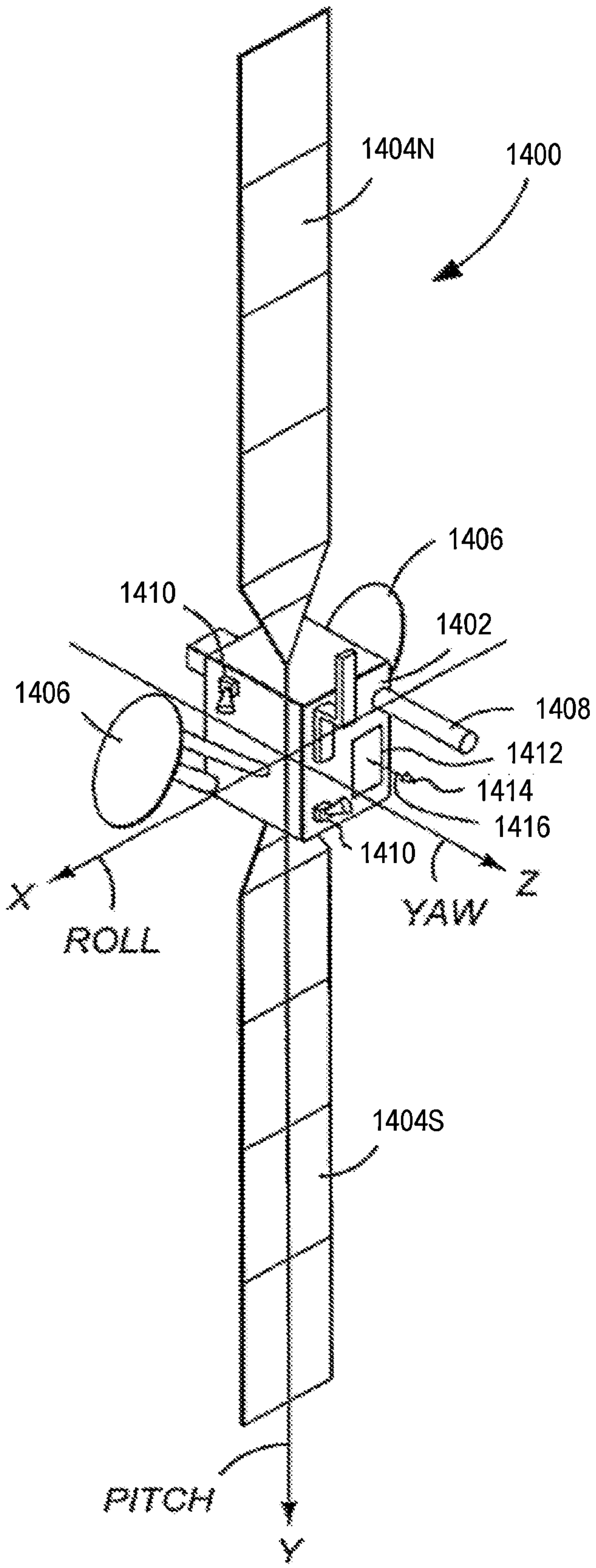
FIG. 14 illustrates a three-axis stabilized satellite or spacecraft.

FIG. 14 illustrates a three-axis stabilized satellite or spacecraft 1400, which is an example platform (an apparatus 1200) housing antenna with a shaped reflector as described herein. The spacecraft 1400 is either situated in a stationary (geostationary or geosynchronous) orbit about the Earth, or in a mid-Earth (MEO) or low-Earth (LEO) orbit. The spacecraft 1400 has a main body or spacecraft bus 1402, a pair of solar panels 1404, a pair of high gain narrow beam antennas 1406, and a telemetry and command omni-directional antenna 1408 which is aimed at a control ground station. The spacecraft 1400 may also include one or more sensors 1410 to measure the attitude of the spacecraft 1400. These sensors may include sun sensors, earth sensors, and star sensors. Since the solar panels are often referred to by the designations “North” and “South”, the solar panels in FIG. 14 are referred to by the numerals 1404N and 1404S for the “North” and “South” solar panels, respectively.

The three axes of the spacecraft 1400 are shown in FIG. 14. The pitch axis Y lies along the plane of the solar panels 1408N and 1408S. The roll axis X and yaw axis Z are perpendicular to the pitch axis Y, and to each other, and lie in the directions and planes shown. The antenna 1408 points to the Earth along the yaw axis Z. The spacecraft 1400 includes a phased array antenna 1412 mounted on the spacecraft bus 1402 or a supporting structure. The phased array antenna 1412 can be used to transmit signals with wide angle or spot beams as desired. The spacecraft 1400 also includes a boom 1416 or other appendage, having a receiving sensor 1414, such as a receiving horn mounted on the boom so that its sensitive axis is directed substantially at the planar array. In some examples, a reflector (e.g., a sub-reflector) is configured (sized and shaped) to cause the incoming rays to be more efficiently delivered while avoiding supporting structures (e.g., the boom 1416 or a mast), for example, by collimating the rays and delivering the rays to the receiving sensor 1414.

While various spatial and directional terms, including but not limited to top, bottom, lower, mid, lateral, horizontal, vertical, front and the like are used to describe the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is “configured to” perform a task or operation is particularly structurally formed, constructed, or adapted in a manner corresponding to the task or operation. For purposes of clarity and the avoidance of doubt, an object that is merely capable of being modified to perform the task or operation is not “configured to” perform the task or operation as used herein.

Any range or value given herein can be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above can relate to one embodiment or can relate to several embodiments. The embodiments are not limited to those that solve any or all of the stated problems or those that have any or all of the stated benefits and advantages. It will further be understood that reference to ‘an’ item refers to one or more of those items.

The term “comprising” is used in this specification to mean including the feature(s) or act(s) followed thereafter, without excluding the presence of one or more additional features or acts. The terms “comprising,” “including,” and “having” are intended to be inclusive and mean that there can be additional elements other than the listed elements. In other words, the use of “including,” “comprising,” “having,” “containing,” “involving,” and variations thereof, is meant to encompass the items listed thereafter and additional items. Further, references to “one implementation” are not intended to be interpreted as excluding the existence of additional implementations that also incorporate the recited features. The term “exemplary” is intended to mean “an example of”.

When introducing elements of aspects and implementations or the examples thereof, the articles “a,” “an,” “the,” and “said” are intended to mean that there are one or more of the elements. In other words, the indefinite articles “a”, “an”, “the”, and “said” as used in the specification and in the claims, unless clearly indicated to the contrary, should be understood to mean “at least one.”

The phrase “one or more of the following: A, B, and C” means “at least one of A and/or at least one of B and/or at least one of C.” The phrase “and/or”, as used in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one implementation, to A only (optionally including elements other than B); in another implementation, to B only (optionally including elements other than A); in yet another implementation, to both A and B (optionally including other elements); etc.

As used in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of or “exactly one of,” or, when used in the claims, “consisting of,” will refer to the inclusion of exactly one element of a number or list of elements. In general, the term “or” as used shall only be interpreted as indicating exclusive alternatives (i.e. “one or the other but not both”) when preceded by terms of exclusivity, such as “cither,” “one of” “only one of” or “exactly one of.” “Consisting essentially of,” when used in the claims, shall have its ordinary meaning as used in the field of patent law.

As used in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified. Thus, as a non-limiting example, “at least one of A and B” (or, equivalently, “at least one of A or B,” or, equivalently “at least one of A and/or B”) can refer, in one implementation, to at least one, optionally including more than one, A, with no B present (and optionally including elements other than B); in another implementation, to at least one, optionally including more than one, B, with no A present (and optionally including elements other than A); in yet another implementation, to at least one, optionally including more than one, A, and at least one, optionally including more than one, B (and optionally including other elements); etc.

Use of ordinal terms such as “first,” “second,” “third,” etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Having described aspects of the various examples in detail, it will be apparent that modifications and variations are possible without departing from the scope of aspects as defined in the appended claims. As various changes could be made in the above constructions, products, and methods without departing from the scope of aspects describe herein, it is intended that all matter contained in the above description and shown in the accompanying drawings shall be interpreted as illustrative and not in a limiting sense.

It is to be understood that the above description is intended to be illustrative, and not restrictive. For example, the above-described implementations (and/or aspects thereof) can be used in combination with each other. In addition, many modifications can be made to adapt a particular situation or material to the teachings of the various implementations described herein without departing from their scope. While the dimensions and types of materials described herein are intended to define the parameters of the various implementations described herein, the implementations are by no means limiting and are example implementations. Many other implementations will be apparent to those of ordinary skill in the art upon reviewing the above description. The scope of the various implementations described herein should, therefore, be determined with reference to the appended claims, along with the full scope of equivalents to which such claims are entitled. In the appended claims, the terms “including” and “in which” are used as the plain-English equivalents of the respective terms “comprising” and “wherein.” Moreover, the terms “first,” “second,” and “third,” etc. are used merely as labels, and are not intended to impose numerical requirements on their objects. Further, the limitations of the following claims are not written in means-plus-function format and are not intended to be interpreted based on 35 U.S.C. § 122(f), unless and until such claim limitations expressly use the phrase “means for” followed by a statement of function void of further structure.

This written description uses examples to disclose the various implementations, including the best mode, and also to enable any person of ordinary skill in the art to practice the various implementations, including making and using any devices or systems and performing any incorporated methods. The patentable scope of the various implementations is defined by the claims, and can include other examples that occur to those persons of ordinary skill in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A method for manufacturing a reflector for an antenna, the method comprising:

tracing a plurality of electromagnetic energy rays from a plurality of scan directions;

shaping a plurality of reflector regions of a reflector surface of the reflector based on the traced plurality of electromagnetic energy rays, wherein the plurality of reflector regions each have different curvatures corresponding to the scan directions such that the traced plurality of electromagnetic energy rays are reflected towards an array aperture;

performing a local optimization of the curvatures of each of the plurality of reflector regions to yield a locally optimized plurality of reflector regions that each direct the traced plurality of electromagnetic energy rays to the array aperture;

blending the locally optimized plurality of reflector regions to yield a blended plurality of reflector regions that together yield a single continuous surface;

performing a global optimization of the blended plurality of reflector regions over the entire single continuous surface to yield a globally optimized plurality of reflector regions that together yield a single continuous reflector surface optimized to maximize the traced plurality of electromagnetic energy rays directed to the array aperture;

generating an overall shape for the reflector surface of the reflector using the globally optimized plurality of reflector regions; and manufacturing a reflector based on the overall shape.

2. The method of claim 1, wherein the tracing is bound by a desired field of view for the reflector.

3. The method of claim 1, wherein the shaping comprises modeling a surface of the plurality of reflector regions with a polynomial and adjusting one or more polynomial coefficients to obtain the different curvatures.

4. The method of claim 3, wherein performing the local optimization comprises using an optimization algorithm that uses a cost function to select one or more polynomial coefficients of the polynomial or a plurality of reflector points, wherein the cost function maximizes an array aperture illumination percentage of the traced plurality of electromagnetic energy rays that reach the array aperture.

5. The method of claim 1, wherein the shaping comprises modeling the reflector surface of the reflector with a set of points and using a spline interpolation to define a continuous surface with a continuous first derivative that passes through the points.

6. The method of claim 1, wherein the shaping comprises overlapping portions of the plurality of reflector regions illuminated in more than one of the plurality of scan directions.

7. The method of claim 1, wherein the blending comprises using one or more polynomials or splines that define the plurality of reflector regions to obtain a plurality of points for each region of the plurality of reflector regions.

8. The method of claim 1, further comprising fitting a global polynomial or a spline across an entire surface encompassing the plurality of reflector regions to form the single continuous surface.

* * * * *